(12) United States Patent
Randle, Jr. et al.

(10) Patent No.: US 7,624,954 B2
(45) Date of Patent: Dec. 1, 2009

(54) INFANT CAR SEAT CADDY

(76) Inventors: James E. Randle, Jr., 115 Green Tree Rd., Sherwood, AR (US) 72120;
Charnelsa Walters, 115 Green Tree Rd., Sherwood, AR (US) 72120

( * ) Notice: Subject to any disclaimer, the term of this patent is extended or adjusted under 35 U.S.C. 154(b) by 144 days.

(21) Appl. No.: 11/953,413

(22) Filed: Dec. 10, 2007

(65) Prior Publication Data
US 2008/0136233 A1  Jun. 12, 2008

Related U.S. Application Data

(60) Provisional application No. 60/873,963, filed on Dec. 11, 2006.

(51) Int. Cl.
*A47K 1/04* (2006.01)

(52) U.S. Cl. .............. 248/129; 248/166; 280/643; 280/649; 297/250.1; 297/256.16

(58) Field of Classification Search ........... 248/129, 248/150, 166; 297/250.1, 256.11, 256.16; 182/15, 17, 152; 280/638, 639, 643, 647, 280/649, 47.38, 47.41, 79.2
See application file for complete search history.

(56) References Cited

U.S. PATENT DOCUMENTS

| | | | | |
|---|---|---|---|---|
| 2,794,558 | A | * | 6/1957 | Miles ..................... 414/12 |
| 2,984,291 | A | * | 5/1961 | Kostenborder et al. ...... 297/130 |
| 4,462,197 | A | * | 7/1984 | D'Alessio et al. ........... 52/637 |
| D324,439 | S | | 3/1992 | Churchill et al. |
| 5,499,831 | A | | 3/1996 | Worth et al. |
| 5,527,096 | A | * | 6/1996 | Shimer .................. 297/327 |
| 5,564,523 | A | * | 10/1996 | Howard .................. 182/63.1 |
| 5,676,386 | A | | 10/1997 | Huang |
| 5,794,951 | A | | 8/1998 | Corley et al. |
| 6,398,233 | B1 | | 6/2002 | Liang et al. |
| 6,626,452 | B2 | | 9/2003 | Yang et al. |
| 2006/0082082 | A1 | | 4/2006 | Reinke |

* cited by examiner

*Primary Examiner*—Korie Chan
(74) *Attorney, Agent, or Firm*—Dale J. Ream

(57) ABSTRACT

The present invention features an infant car seat caddy, which is configured in the fully extended or raised position. The present invention comprises a first support assembly and a second support assembly, which are joined by a series of braces pivotally attached thereto. The first and second support assemblies which are attached together by the braces can be raised into an extended position and lowered into a retracted position.

1 Claim, 4 Drawing Sheets

INFANT CAR SEAT CADDY

CROSS REFERENCE

This application claims priority to U.S. provisional application Ser. No. 60/873,963 filed Dec. 11, 2006, the specification of which is incorporated herein by reference in its entirety.

BACKGROUND OF THE INVENTION

The present invention relates to car seats, e.g., infant car seats. More specifically, this invention is concerned with an infant car seat caddy that supports an infant car seat above a ground or support surface and permits the infant car seat situated thereon to be transported from a first location to a second location by pushing and steering the carrying handle of the infant car seat.

Infant car seats are used to carry and transport infants and small children to a vehicle and to secure said infants and small children to the interior of a vehicle, usually upon a vehicle seat, by means of seat belts and passenger harnesses. The infant car seats are used to secure infants and small children within the interior of a vehicle as the seats and associated seat belts and passenger harnesses of a vehicle do not accommodate the relatively smaller sizes of infants and small children. An infant or small child secured to a vehicle seat by a seat belt or passenger harness would not be adequately restrained by the seat belt or passenger harness, especially when the vehicle experiences sudden deceleration or is impacted by another vehicle.

A typical infant car seat is equipped with dedicated restraining straps to secure the infant or small child to the infant car seat and a series of slots, openings, or other straps to receive or connect to the seat belts or passenger harnesses of a vehicle seat. In this manner, the infant car seat can be securely attached to a vehicle seat, and an infant or small child can be securely attached to the infant car seat. Nevertheless, conventional infant car seats suffer from several disadvantages. They are typically constructed of a bulky seat portion or section that receives or holds the infant or small child therein and an attached carrying handle. The carrying handle projects at some distance above the seat portion and must of sufficient size and bulk to bear the weight of the infant car seat with an infant or small child situated therein. These features of an infant car seat make it difficult to carry either by the carrying handle or by the seat portion, especially when it is necessary to transport an infant car seat with an infant or small child situated therein over an appreciable distance.

What is needed then to overcome the aforementioned disadvantages of conventional infant car seats is the provision of an infant car seat caddy that can receive and support an infant car seat with an infant or small child situated therein and permit the infant car seat with infant or small child to be transported from a first location to a second location. The subject of the instant invention introduces an infant car seat caddy that can be extended to full height during use and retracted during non-use for storage. During extension of the infant car seat caddy, an infant car seat is situated, located, or positioned on the top of the infant car seat caddy and wheeled over the distance to be traveled by pushing the infant car seat or carrying handle thereof and steering or maneuvering the infant car seat as needed to direct the infant car seat and infant car seat caddy from a first location to a second location.

Numerous designs for infant car seats and infant car seat strollers have been provided in the prior art. Even though these designs may be suitable for the specific individual purposes to which they address, they would not be suitable for the purposes of the present invention as such designs are intended to function as infant car seats and conventional infant and small child transport devices, such as strollers. The infant car seat strollers available in the prior art are generally elaborate in design and cumbersome to use. These designs are exemplified by the following patents:

U.S. Pat. No. 2,720,911, Convertible Baby Stroller and Child's Seat For Automobiles, issued to Lantz on 18 Oct. 1955;

U.S. Pat. No. 3,984,115, Convertible Baby Carrier, issued to Miller on 5 Oct. 1976;

U.S. Pat. No. 4,586,721, Convertible Stroller, issued to Harada et al. on 6 May 1986;

U.S. Pat. No. 4,762,331, Combination Automobile Seat And Stroller, issued to Tucker et al. on 9 Aug. 1988;

U.S. Pat. No. 4,915,401, Child Carrier Usable As Backpack, Stroller And Recliner, issued to Severson et al. on 10 Apr. 1990;

U.S. Pat. No. 6,986,518, Combined Baby Car Seat And Stroller, issued to Besaw 17 Jan. 2006; and U.S. Pat. No. 7,011,316, Infant Car Seat Stroller, issued to Peridon on 14 Mar. 2006.

As illustrated by the background art, efforts are continuously being made in an attempt to develop devices for transporting small children outside of a vehicle. No prior effort, however, provides the benefits attendant with the present invention.

As such, it may be appreciated that there is a continuing need for a new and improved infant car seat caddy, said infant car seat caddy able to be extended to full height during use and retracted to a compact configuration during non-use. During use, the infant car seat caddy receives on the top end thereof an infant car seat with an infant or small child situated therein. The infant car seat is wheeled over the distance to be traveled by pushing the infant car seat or carrying handle thereof and steering or maneuvering the infant car seat as needed to direct the infant car seat and infant car seat caddy from a first location to a second location. In these respects, the present invention substantially departs from the conventional concepts and designs of the prior art, and in so doing provides an apparatus that substantially fulfills this need. Additionally, the prior patents and commercial techniques do not suggest the present inventive combination of component elements arranged and configured as disclosed herein.

The present invention achieves its intended purposes, objects, and advantages through a new, useful, and unobvious combination of method steps and component elements, with the use of a minimum number of functioning parts, at a reasonable cost to manufacture, and by employing only readily available materials.

BRIEF DESCRIPTION OF THE DRAWINGS

The foregoing and other objects, features, and advantages of the invention will become more fully understood from the following description of the preferred embodiment of the invention as illustrated in the accompanying drawings in which like reference characters refer to the same parts throughout different views. The drawings are not necessarily to scale, emphasis instead being placed upon illustrating the principles of the invention.

DRAWING REFERENCE NUMERALS

10 Infant Car Seat Caddy
12 First Support Assembly
14 Second Support Assembly
16 First Tubular Member
18 Second Tubular Member
20 Upper Section of First Tubular Member
22 Middle Section of First Tubular Member
24 Lower Section of First Tubular Member
26 Upper Section of Second Tubular Member
28 Middle Section of Second Tubular Member
30 Lower Section of Second Tubular Member
32 First Brace
34 First End of First Brace
36 Second End of First Brace
38 Second Brace
40 First End of Second Brace
42 Second End of Second Brace
44 Pad
46 Swivel Wheel
48 Brake
50 Third Tubular Member
52 Fourth Tubular Member
54 Upper Section of Third Tubular Member
56 Middle Section of Third Tubular Member
58 Lower Section of Third Tubular Member
60 Upper Section of Fourth Tubular Member
62 Middle Section of Fourth Tubular Member
64 Lower Section of Fourth Tubular Member
66 Third Brace
68 First End of Third Brace
70 Second End of Third Brace
72 Fourth Brace
74 First End of Fourth Brace
76 Second End Fourth Brace
78 Fifth Brace
80 First End of Fifth Brace
82 Second End of Fifth Brace
84 Sixth Brace
86 First End of Sixth Brace
88 Second End of Sixth Brace
90 Seventh Brace
92 First End of Seventh Brace
94 Second End of Seventh Brace
96 Eighth Brace
98 First End of Eighth Brace
100 Second End of Eighth Brace
102 Ninth Brace
104 First End of Ninth Brace
106 Second End of Ninth Brace
108 Tenth Brace
110 First End of Tenth Brace
112 Second End of Tenth Brace
114 Eleventh Brace
116 First End of Eleventh Brace
118 Second End of Eleventh Brace
120 Twelfth Brace
122 First End of Twelfth Brace
124 Second End Twelfth Brace
126 Shelf
128 Car Seat
130 Seat
132 Carrying Handle
134 Knob

DESCRIPTION OF PREFERRED EMBODIMENTS

Figure 1:
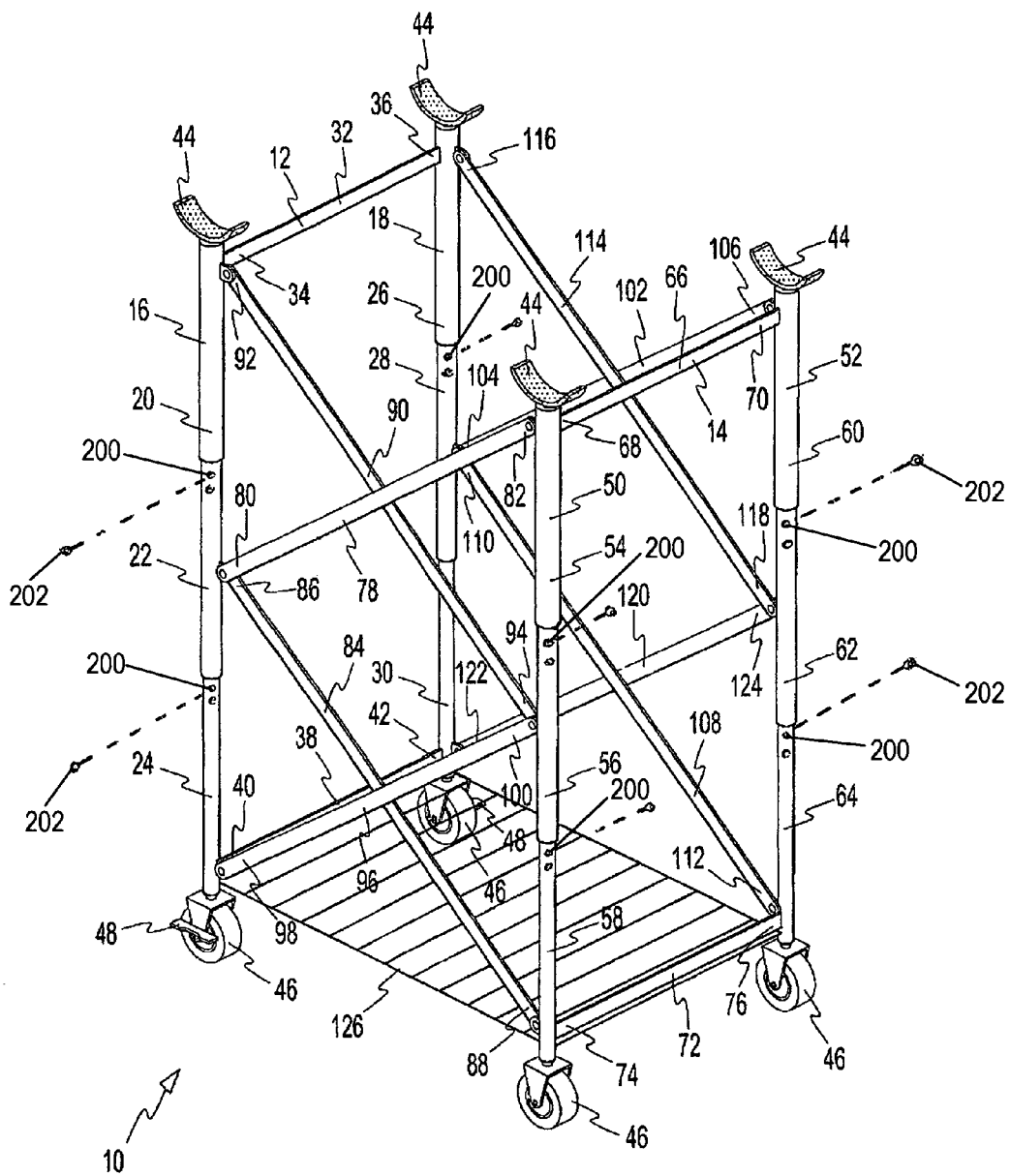
FIG. 1 is a perspective view of an infant car seat caddy in an extended configuration in accordance with the present invention.

Referring now to the drawings and, in particular, to FIG. 1 wherein there is illustrated an embodiment of the infant car seat caddy 10, which is configured in the fully extended or raised position. The present invention 10 comprises a first support assembly 12 and a second support assembly 14, which are joined by a series of braces pivotally attached (see FIG. 4) thereto. The first 12 and second 14 support assemblies which are attached together by the braces can be raised into an extended position and lowered into a retracted position.

The first support assembly 12 comprises a first tubular member 16 and a second tubular member 18. The first tubular member 16 comprises an upper section 20, a middle section 22, and a lower section 24. The middle section 22 is telescopically engaged within the upper section 20, and the lower section 24 is telescopically engaged within the middle section 22. The second tubular member 18 comprises an upper section 26, a middle section 28, and a lower section 30. The middle section 28 is telescopically engaged within the upper section 26, and the lower section 30 is telescopically engaged within the middle section 28.

A first brace 32 is attached at a first end 34 thereof to the upper section 20 of the first tubular member 16 and at a second end 36 thereof to the upper section 26 of the second tubular member 18. A second brace 38 is connected at a first end 40 thereof to the lower section 24 of the first tubular member 16 and at a second end 42 thereof to the lower section 30 of the second tubular member 8. A non-skid pad 44 is attached to the top end of the upper section 20 of the first tubular member 16, and a swivel wheel 46 with hand brake 48 is pivotally attached to the bottom end of the lower section 24 of the first tubular member 16. Similarly, a non-skid pad 44 is attached to the top end of the upper section 26 of the second tubular member 18, and a swivel wheel 46 with hand brake 48 is pivotally attached to the bottom end of the lower section 30 of the second tubular member 18.

The second support assembly 14 comprises a third tubular member 50 and a fourth tubular member 52. The third tubular member 50 comprises an upper section 54, a middle section 56, and a lower section 58. The middle section 56 is telescopically engaged within the upper section 54, and the lower section 58 is telescopically engaged within the middle section 56. The fourth tubular member 52 comprises an upper section 60, a middle section 62, and a lower section 64. The middle section 62 is telescopically engaged within the upper section 60, and the lower section 64 is telescopically engaged within the middle section 62. A third brace 66 is attached at a first end 68 thereof to the upper section 54 of the third tubular member 50 and at a second end 70 thereof to the upper section 60 of the fourth tubular member 52. A fourth brace 72 is connected at a first end 74 thereof to the lower section 58 of the third tubular member 50 and at a second end 76 thereof to the lower section 64 of the fourth tubular member 52.

A non-skid pad 44 is attached to the top end of the upper section 54 of the third tubular member 50, and a swivel wheel 46 is pivotally attached to the bottom end of the lower section 58 of the third tubular member 50. A non-skid pad 44 is also affixed to the top end of the upper section 60 of the fourth tubular member 52, and a swivel wheel 46 is pivotally attached to the bottom end of the lower section 64 of the fourth tubular member 52.

Referring again to FIG. 1, a fifth brace 78 is pivotally attached at a first end 80 thereof to the middle section 22 of the first tubular member 16 of the first support assembly 12 and at a second end 82 thereof to the upper section 54 of the third tubular member 50 of the second support assembly 14. A sixth brace 84 is pivotally attached at a first end 86 thereof to the middle section 22 of the first tubular member 16 of the first support assembly 12 and at a second end 88 thereof to the lower section 58 of the third tubular member 50 of the second support assembly 14. A seventh brace 90 is pivotally attached at a first end 92 thereof to the upper section 20 of the first tubular member 16 of the first support assembly 12 and at a second end 94 thereof to the middle section 56 of the third tubular member 50 of the second support assembly 14. An eighth brace 96 is pivotally attached at a first end 98 thereof to the lower section 24 of the first tubular member 16 of the first support assembly 12 and at a second end 100 thereof to the middle section 56 of the third tubular member 50 of the second support assembly 14.

A ninth brace 102 is pivotally attached at a first end 104 thereof to the middle section 28 of the second tubular member 18 of the first support assembly 12 and at a second end 106 thereof to the upper section 60 of the fourth tubular member 52 of the second support assembly 14. A tenth brace 108 is pivotally attached at a first end 110 thereof to the middle section 28 of the second tubular member 18 of the first support assembly 12 and at a second end 112 thereof to the lower section 64 of the fourth tubular member 52 of the second support assembly 14. A eleventh brace 114 is pivotally attached at a first end 116 thereof to the upper section 26 of the second tubular member 18 of the first support assembly 12 and at a second end 118 thereof to the middle section 62 of the fourth tubular member 52 of the second support assembly 14. A twelfth brace 120 is pivotally attached at a first end 122 thereof to the lower section 30 of the second tubular member 18 of the first support assembly 12 and at a second end 124 thereof to the middle section 62 of the fourth tubular member 52 of the second support assembly 14. The braces 78, 84, 90, 96, 102, 108, 114, 120 stabilize the infant car seat caddy 10 when it is in a raised or extended configuration, a lowered or compact configuration, and during transport of an infant car seat upon the infant car seat caddy 10.

In some embodiments, a shelf 126 is attached at the lower portion of the infant car seat caddy 10. More specifically, the shelf 126 is attached at corners thereof to the lower sections 24, 30, 58, 64 of respective tubular members 16, 18, 50, 52. In some embodiments, the shelf is constructed from an elastic material, such that when the caddy is collapsed to its contracted position, the shelf can stretch to accommodate for the braces being more horizontal with respect to the tubular members.

The infant car seat caddy 10 and the components thereof (tubular members and braces) are manufactured of material that is lightweight, rigid, durable, and resistant to oxidation, corrosion, and the like, such as non-ferrous metals, stainless steel, aluminum, plastic, fiberglass, and various composite materials.

In some embodiments, the middle and lower sections of the tubular members comprise at least one hole 200 wherein a pin 202 may be inserted to lock the tubular members in an extended telescoping configuration (see FIG. 1).

Figure 2:
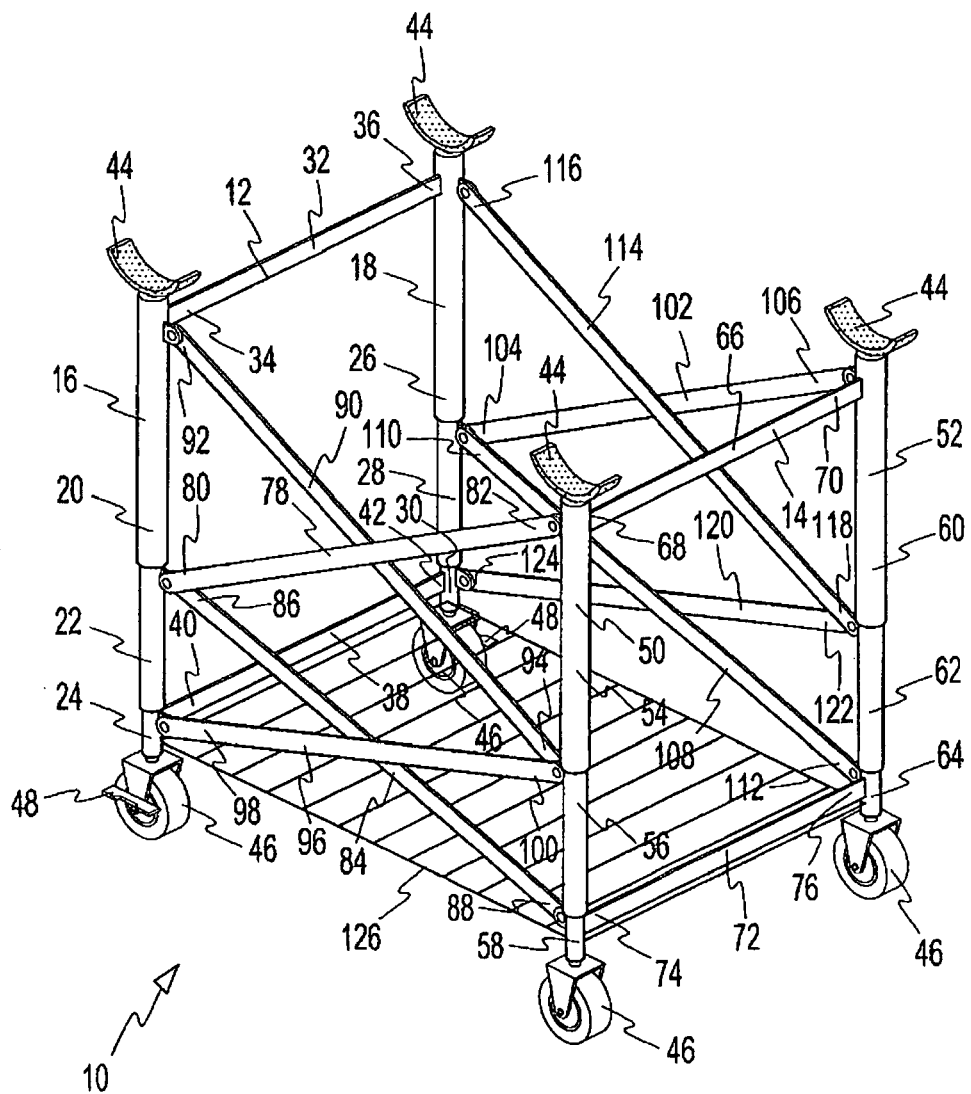
FIG. 2 is a perspective view of an infant car seat caddy in a compacted configuration in accordance with the present invention.

Referring to FIG. 2, therein illustrated is the infant car seat caddy 10 in the retracted or lowered position. The lower section 24 of the first tubular member 16 of the first support assembly 12 retracts within the middle section 22 thereof and the middle section 22 thereof retracts within the upper section 20 of the first tubular member 16. The lower section 30 of the second tubular member 18 of the first support assembly 12 retracts within the middle section 28 thereof, and the middle section 28 thereof retracts within the upper section 26 of the second tubular member 18. The lower section 58 of the third tubular member 50 of the second support assembly 14 retracts within the middle section 56 thereof, and the middle section 56 thereof retracts within the upper section 54 of the third tubular member 50. The lower section 64 of the fourth tubular member 52 of the second support assembly 14 retracts within the middle section 62 thereof, and the middle section 62 thereof retracts within the upper section 60 of the fourth tubular member 52. The braces 78, 84, 90, 96, 102, 108, 114, 120 pivot at respective attachments to the tubular members 16, 18, 50, 52 as the support assemblies 14, 16 of the caddy 10 are lowered upon respective upper sections 20, 26, 54, 60, middle sections 22, 28, 56, 62, and lower sections 24, 30, 58, 64 thereof. Conversely, the braces 78, 84, 90, 96, 102, 108, 114, 120 pivot at respective attachments to the tubular members 16, 18, 50, 52 as the support assemblies 14, 16 of the caddy 10 are raised from respective upper sections 20, 26, 54, 60, middle sections 22, 28, 56, 62, and lower sections 24, 30, 58, 64 thereof. The infant car seat caddy 10 contains internal locking mechanisms of the type well known in prior art and design that are located within the upper sections 20, 26, 54, 60, middle sections 22, 28, 56, 62, and lower sections 24, 30, 58, 64 of respective tubular members 16, 18, 50, 52 to maintain the infant car seat caddy 10 in position when it is raised and lowered.

Figure 3:
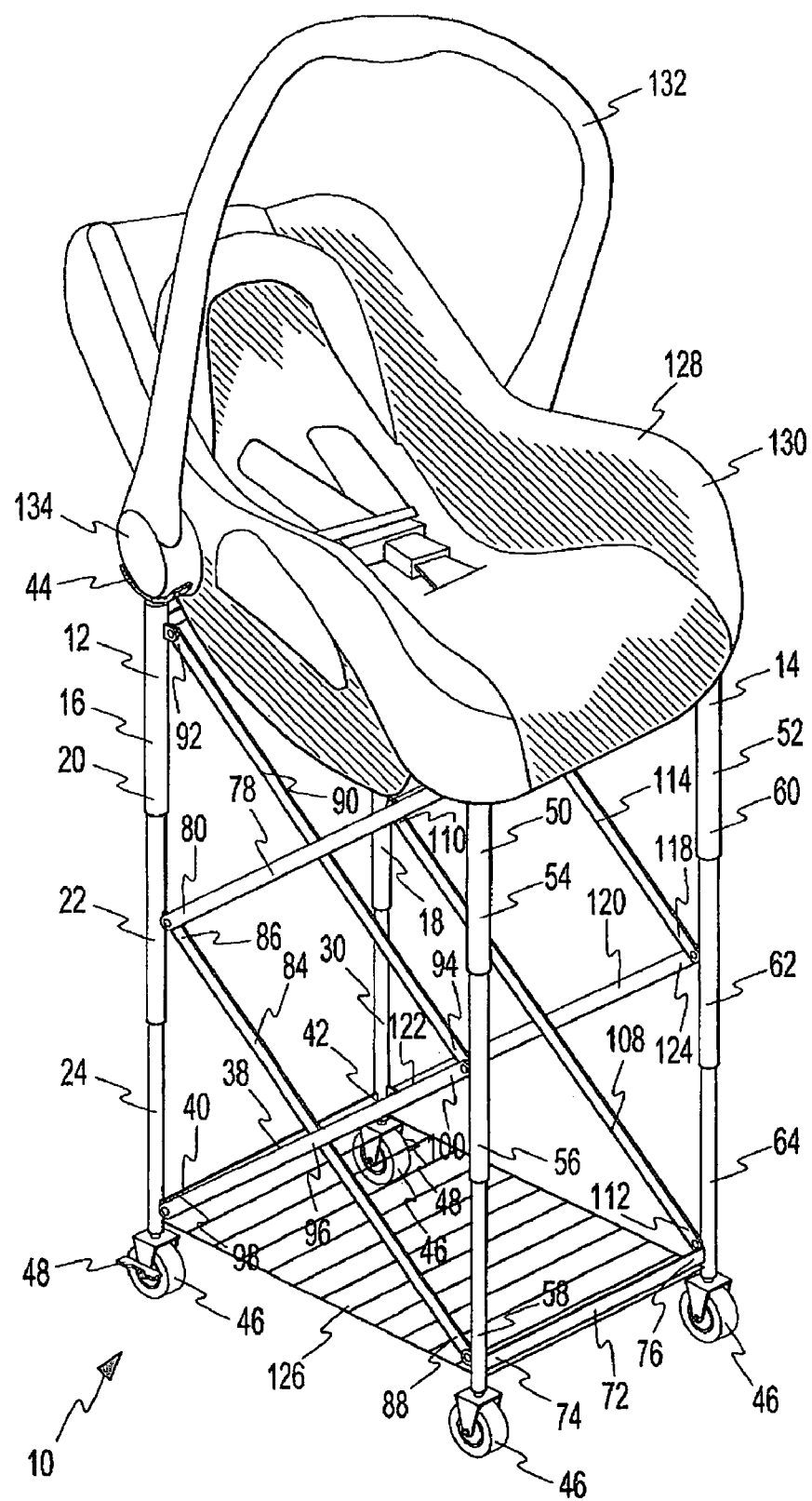
FIG. 3 is a perspective view of an infant car seat caddy in an extended configuration with an infant car seat located thereon for transport in accordance with the present invention.

As illustrated in FIG. 3, an infant car seat 128 is located upon the infant car seat caddy 10. The infant car seat 128 comprises a seat 130, a pivoting carrying handle 132, and two knobs 134 located at opposite ends of the carrying handle 132. The knobs 134 connect the carrying handle 132 to the seat 130 and allow the carrying handle 132 to pivot as needed with respect to the seat 130. The knobs 134 are supported by the pads 44 attached to the top ends of the tubular members 16, 18 of the first support assembly 12, and the front end of the seat 130 is situated on and over the pads 44 attached to the top ends of the tubular members 50, 52 of the second support assembly 14. In this manner, the infant car seat 128 and infant car seat caddy 10 can be directed over the surface to travel by steering, pushing, or otherwise maneuvering the carrying handle 132 and seat 130 from a first location to a second location. The infant car seat caddy 10 travels upon a ground surface or support by the swivel wheels 46. When it is necessary to pause, the hand brakes 48 can be activated on two cooperating swivel wheels 46 to prevent the infant car seat caddy 10 and infant car seat 128 from drifting or otherwise moving from its temporary location.

Figure 4:
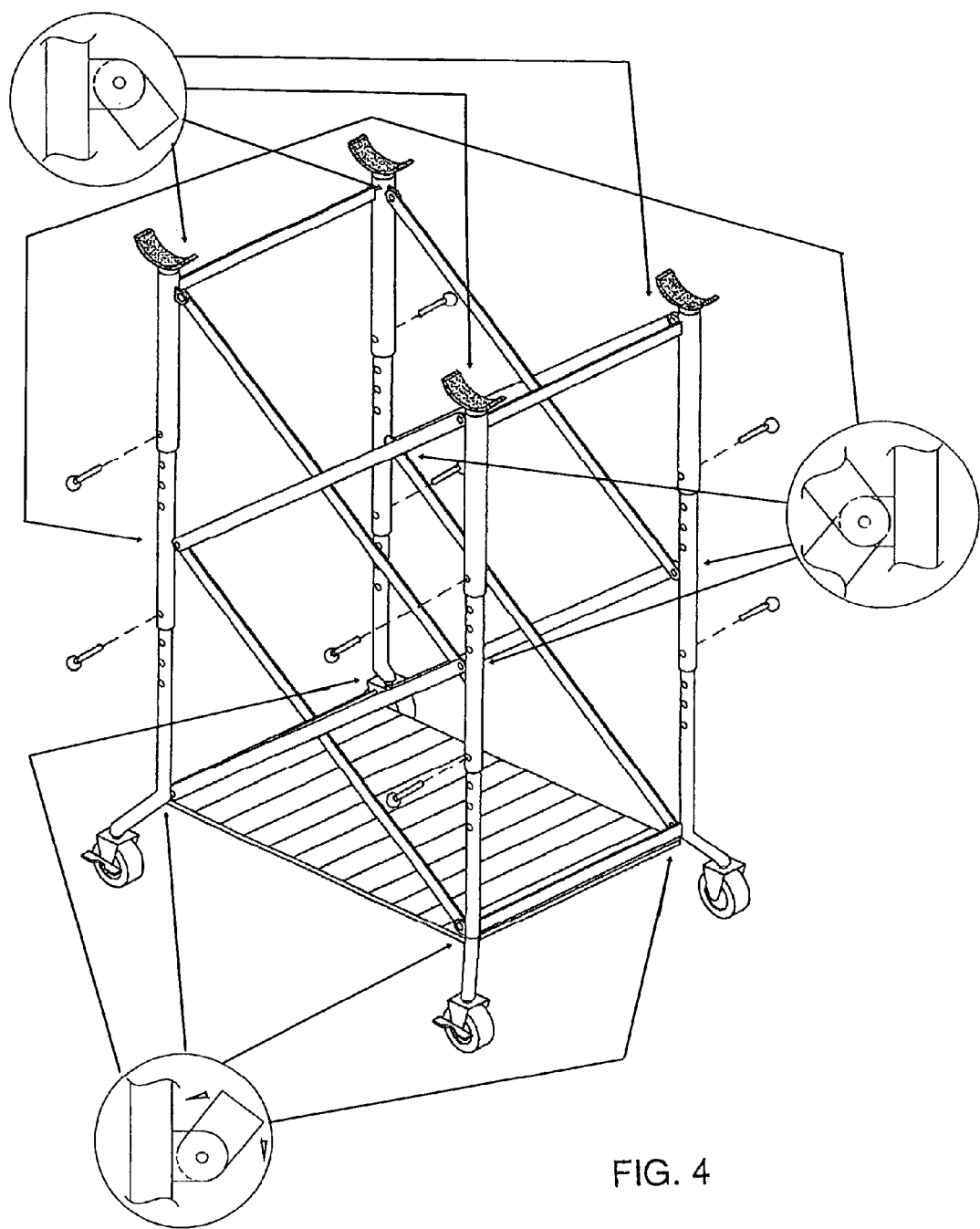
FIG. 4 shows a perspective view of an infant car seat caddy having the wheels being extended outward for added stability.

In some embodiments, the tubular members of the infant car seat caddy 10 comprises one or more holes 200 for an insertion of a peg 202, wherein the peg 202 is effective to maintain the infant car seat caddy 10 in an expanded position by preventing the larger tubular member from collapsing onto the smaller tubular member (see FIG. 1 and FIG. 4).

In some embodiments, the braces are pivotally attached to the tubular members as shown in the enlargements in FIG. 4.

The infant car seat caddy 10 can be used with a wide variety of infant car seats so that the infant car seats can be supported thereon with said infant car seats able to be steered or maneuvered by respective carrying handles or other component thereof.

While this invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be understood by persons skilled in the art that an improved infant car seat caddy has been provided. The invention is relatively simple and easy to manufacture, yet affords a variety of uses. While my description contains many specificities, these should not be construed as limitations on the scope of the invention, but rather as an exemplification of the preferred embodiment thereof. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, failing within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A infant car seat caddy comprising:

a first support assembly and a second support assembly, which are joined by a series of braces pivotally attached thereto; the series of braces includes a first brace, second brace, third brace, fourth brace, fifth brace, sixth brace, seventh brace, eighth brace, ninth brace, tenth brace, eleventh brace, and twelfth brace;

the first support assembly comprises a first tubular member and a second tubular member; the first tubular member comprises an upper section, a middle section, and a lower section, wherein the middle section is telescopically engaged within the upper section, and the lower section is telescopically engaged within the middle section, the second tubular member comprises an upper section, a middle section, and a lower section, wherein the middle section is telescopically engaged within the upper section, and the lower section is telescopically engaged within the middle section;

the first brace being attached at a first end thereof to the upper section of the first tubular member and at a second end thereof to the upper section of the second tubular member;

the second brace being connected at a first end thereof to the lower section of the first tubular member and at a second end thereof to the lower section of the second tubular member;

the second support assembly comprises a third tubular member and a fourth tubular member, the third tubular member comprises an upper section, a middle section, and a lower section, wherein the middle section is telescopically engaged within the upper section, and the lower section is telescopically engaged within the middle section, the fourth tubular member comprises an upper section, a middle section, and a lower section, wherein the middle section is telescopically engaged within the upper section, and the lower section is telescopically engaged within the middle section;

the third brace being attached at a first end thereof to the upper section of the third tubular member and at a second end thereof to the upper section of the fourth tubular member;

the fourth brace is connected at a first end thereof to the lower section of the third tubular member and at a second end thereof to the lower section of the fourth tubular member;

a swivel wheel is pivotally attached to the bottom end of the lower section of the first, second, third, and fourth tubular members;

a non-skid pad being attached to the top end of the upper section of the first, second, third, and fourth tubular members;

the fifth brace is pivotally attached at a first end thereof to the middle section of the first tubular member of the first support assembly and at a second end thereof to the upper section of the third tubular member of the second support assembly;

the sixth brace is pivotally attached at a first end thereof to the middle section of the first tubular member of the first support assembly and at a second end thereof to the lower section of the third tubular member of the second support assembly;

the seventh brace is pivotally attached at a first end thereof to the upper section of the first tubular member of the first support assembly and at a second end thereof to the middle section of the third tubular member of the second support assembly;

the eighth brace is pivotally attached at a first end thereof to the lower section of the first tubular member of the first support assembly and at a second end thereof to the middle section of the third tubular member of the second support assembly;

the ninth brace is pivotally attached at a first end thereof to the middle section of the second tubular member of the first support assembly and at a second end thereof to the upper section of the fourth tubular member of the second support assembly;

the tenth brace is pivotally attached at a first end thereof to the middle section of the second tubular member of the first support assembly and at a second end thereof to the lower section of the fourth tubular member of the second support assembly;

the eleventh brace is pivotally attached at a first end thereof to the upper section of the second tubular member of the first support assembly and at a second end thereof to the middle section of the fourth tubular member of the second support assembly; and the twelfth brace is pivotally attached at a first end thereof to the lower section of the second tubular member of the first support assembly and at a second end thereof to the middle section of the fourth tubular member of the second support assembly;

wherein the braces stabilize the car seat caddy when it is in a raised or extended configuration, in a lowered or compact configuration, and during transport of an infant car seat upon the car seat caddy.

* * * * *